(12) United States Patent
Mukaida (10) Patent No.: US 7,685,356 B2
(45) Date of Patent: Mar. 23, 2010

(54) CHRONOLOGICAL IDENTIFICATION IN FLASH MEMORY USING CYCLIC NUMBERS

(75) Inventor: Naoki Mukaida, Tokyo (JP)

(73) Assignee: TDK Corporation, Tokyo (JP)

( * ) Notice: Subject to any disclaimer, the term of this patent is extended or adjusted under 35 U.S.C. 154(b) by 393 days.

(21) Appl. No.: 11/802,396

(22) Filed: May 22, 2007

(65) Prior Publication Data

US 2007/0283083 A1 Dec. 6, 2007

(30) Foreign Application Priority Data

May 30, 2006 (JP) .......................... P2006-149936

(51) Int. Cl.
*G06F 12/00* (2006.01)
(52) U.S. Cl. .................... 711/103; 711/151; 711/158; 711/136; 711/E12.008; 707/695; 365/185.33
(58) Field of Classification Search ................ 711/156, 711/158, 202, 204, E12.008, 136, 133, 160, 711/165, 151, 118; 365/185.33
See application file for complete search history.

(56) References Cited

U.S. PATENT DOCUMENTS

| | | | | |
|---|---|---|---|---|
| 6,076,137 | A * | 6/2000 | Asnaashari | 711/103 |
| 6,763,424 | B2 * | 7/2004 | Conley | 711/103 |
| 6,862,663 | B1 * | 3/2005 | Bateman | 711/133 |
| 6,931,493 | B2 * | 8/2005 | Johns et al. | 711/136 |
| 6,978,342 | B1 * | 12/2005 | Estakhri et al. | 711/103 |
| 6,986,001 | B2 * | 1/2006 | Zhang | 711/133 |
| 2005/0162930 | A1 | 7/2005 | Mukaida | |
| 2006/0020747 | A1 * | 1/2006 | Estakhri et al. | 711/103 |

FOREIGN PATENT DOCUMENTS

| | | |
|---|---|---|
| JP | A-04-256011 | 9/1992 |
| JP | A-2000-510634 | 8/2000 |
| JP | A 2005-190288 | 7/2005 |
| JP | A-2006-048585 | 2/2006 |

OTHER PUBLICATIONS

Chiang et al. "Managing Flash Memory in Personal Communication Devices", 1997,IEEE all.*
Lim et al. "Hashing directory scheme for NAND Flash File System", Feb. 2007, IEEE all.*
Jan-Ti,Performance Comparison of Logical-Address-to-Physical-Address Algorithms for Non-volatile Memory, 2003,IEEE all.*

* cited by examiner

*Primary Examiner*—Reginald G Bragdon
*Assistant Examiner*—Arvind Talukdar
(74) *Attorney, Agent, or Firm*—Oliff & Berridge, PLC (57) ABSTRACT

Chronological identification information is composed of a plurality of cyclic numbers with priorities. For generating new chronological identification information, the chronological relation is compared in order from cyclic numbers with the highest priority to extract the newest chronological identification information in the chronological relation; when the newest chronological identification information in the chronological relation is extracted, a cyclic number with a priority as a comparison target in the extraction of the extracted chronological identification information is determined to be a cyclic number with the priority in the newly generated chronological identification information. When the cyclic numbers with a priority compared as comparison targets in the chronological identification information all are equal, no further extraction is carried out and the cyclic number subsequent to the cyclic numbers is determined to be a cyclic number with the priority in the newly generated chronological identification information.

10 Claims, 5 Drawing Sheets

CHRONOLOGICAL IDENTIFICATION IN FLASH MEMORY USING CYCLIC NUMBERS

CROSS-REFERENCE TO RELATED APPLICATION

This application claims the benefit of priority from Japanese Patent Application No. 2006-149936, filed in May. 30, 2006, the entire contents of which are incorporated herein by reference.

BACKGROUND OF THE INVENTION

1. Field of the Invention

The present invention relates to a memory controller for controlling access to a flash memory in which stored data is erased in units of physical blocks each consisting of a plurality of memory cells, a flash memory system with the memory controller, and a control method of the flash memory.

2. Related Background Art

In recent years, flash memories, particularly, NAND type flash memories are popularly used as semiconductor memories used in memory systems such as memory cards and silicon disks. In a storage device using this NAND type flash memory, it is necessary to accurately administer a correspondence relation between logical addresses supplied by a host system and physical addresses in the flash memory. For this reason, it is common practice to write, for example, in a redundant region of a physical block, logical address information indicating a scope of logical addresses corresponding to data written in the physical block.

For updating data stored in this NAND type flash memory, new data is written into another physical block in which stored data is erased, and stored data in a physical block storing old data is erased. In certain cases, however, the stored data is not immediately erased from the physical block storing the old data, but the physical block storing the old data coexists with the physical block storing the new data. In such cases, there exist a plurality of physical blocks in which the same logical address information is written in their redundant region, and it is thus necessary to judge a chronological relation of data stored in these physical blocks.

In this connection, Patent Document 1 describes the technology of writing chronological identification information indicating a chronological relation of data stored in physical blocks, together with the logical address information, in the redundant regions of the physical blocks. This chronological identification information used is cyclic numbers that go back to the first number in a predetermined cycle. [Patent Document 1] Japanese Patent Application 2005-190288

In the conventional technology described above, however, a difference can be large between a cyclic number written in a physical block storing old data and a cyclic number written in a physical block storing new data, and in this case it becomes infeasible to determine the chronological relation on the basis of the cyclic numbers. For example, let us explain a case using cyclic numbers starting from 0 and returning to 0 after 15. In this setting, supposing there are a physical block in which 12 is written as a cyclic number and a physical block in which 13 is written as a cyclic number, one might add a physical block in which 14 is written as a cyclic number, and erase stored data in the physical block in which 13 is written as a cyclic number. Then one might add a physical block in which 15 is written as a cyclic number and erase stored data in the physical block in which 14 is written as a cyclic number. Subsequently, one might add a physical block in which 0 is written as a cyclic number and erase stored data in the physical block in which 15 is written as a cyclic number. As such processes are repeated to leave the physical block in which 12 is written as a cyclic number and a physical block in which 4 is written as a cyclic number, the number of steps from 12 to 4 (number of stages with advances of cyclic numbers according to a cycle order) becomes equal to the number of steps from 4 to 12, and it becomes infeasible to determine the chronological relation on the basis of the cyclic numbers.

An object of the present invention is therefore to provide a memory controller capable of, when there are a plurality of physical blocks storing data with an identical scope of logical addresses in a flash memory as a target of access, accurately determining a chronological relation thereof, a flash memory system provided with the memory controller, and a control method of the flash memory.

SUMMARY OF THE INVENTION

A memory controller of the present invention is a memory controller for controlling access to a flash memory in which stored data is erased in units of physical blocks, according to information supplied from a host system, the memory controller comprising: address administering means for administering a correspondence relation between logical addresses supplied from the host system and physical addresses in the flash memory; identification information generating means for generating chronological identification information which is information to discriminate a chronological relation of physical blocks storing data in an identical scope of logical addresses and which is information including a plurality of cyclic numbers provided with priorities; writing means for writing in a physical block in which data supplied from the host system is written, the chronological identification information corresponding to the data written in the physical block; reading means for reading the chronological identification information written by the writing means; and chronology determining means for determining, when there are a plurality of physical blocks storing data in an identical scope of logical addresses, determining a chronological relation of the plurality of physical blocks, based on a sequence of cyclic numbers with each priority included in the chronological identification information; wherein the chronological identification information is generated as follows: when the chronological relation is compared in order from the cyclic numbers with the highest priority, cyclic numbers as comparison targets at each priority become cyclic numbers in an identical stage in a cycle order or cyclic numbers one stage different in the cycle order.

In the determination of the chronological relation based on the chronological identification information, the chronological relation is determined in order from the cyclic numbers with the highest priority and, for the chronological identification information including the same cyclic number with a higher priority, the chronological relation of the chronological identification information is discriminated based on cyclic numbers with a lower priority. Therefore, comparison targets at each priority are only the chronological identification information including the same cyclic number with a priority higher than the priority of interest, and thus cyclic numbers as comparison targets at each priority become cyclic numbers in the same stage in the cycle order or cyclic numbers one stage different in the cycle order.

Preferably, the identification information generating means compares the cyclic numbers included in the chronological identification information of physical blocks storing data in an identical scope of logical addresses to those for data stored in a physical block in which the chronological identification information newly generated is to be written, from the highest priority, sequentially extracts the chronological identification information including a cyclic number in a later stage in the cycle order at each priority, and terminates the extracting process when the cyclic numbers as comparison targets in the extracting process come to be all in an identical stage; when the extracting results that the cyclic numbers with the priority as comparison targets are cyclic numbers one stage different, a cyclic number posterior in the cycle order is defined as a cyclic number with the priority; when the extracting process ends up with a result that the cyclic numbers with a priority as comparison targets all are in an identical stage, the chronological identification information is generated so that a cyclic number subsequent in the cycle order to the cyclic numbers as the comparison targets is defined as a cyclic number with the priority.

Namely, for generating new chronological identification information, the chronological relation is compared in order from the cyclic numbers with the highest priority to extract the newest chronological identification information in the chronological relation, and when the newest chronological identification information in the chronological relation is extracted, the cyclic number with the priority as a comparison target in the extraction of the extracted chronological identification information is determined to be the cyclic number with the priority in the newly generated chronological identification information. When the cyclic numbers with the priority compared as comparison targets in the chronological identification information all are equal (including a case where there is only one chronological identification information as a comparison target), no further extraction is carried out, and the cyclic number subsequent to the cyclic number of the target is determined to be the cyclic number with the priority in the newly generated chronological identification information.

Preferably, when an allowable number of physical blocks storing data in an identical scope of logical addresses is a positive integer n, a number of cyclic numbers included in the chronological identification information is set to (n−1).

A flash memory system of the present invention comprises the foregoing memory controller and a flash memory.

A control method of a flash memory according to the present invention is a control method of a flash memory for controlling access to the flash memory in which stored data is erased in units of physical blocks, according to information supplied from a host system, the control method comprising: an address administering step of administering a correspondence relation between logical addresses supplied from the host system and physical addresses in the flash memory; an identification information generating step of generating chronological identification information which is information to discriminate a chronological relation of physical blocks storing data in an identical scope of logical addresses and which is information including a plurality of cyclic numbers provided with priorities; a writing step of writing in a physical block in which data supplied from the host system is written, the chronological identification information corresponding to the data written in the physical block; and a chronology determining step of, when there are a plurality of physical blocks storing data in an identical scope of logical addresses, determining a chronological relation of the plurality of physical blocks, based on a sequence of cyclic numbers with each priority included in the chronological identification information; wherein the chronological identification information is generated as follows: when the chronological relation is compared in order from the cyclic numbers with the highest priority, cyclic numbers as comparison targets at each priority become cyclic numbers in an identical stage in a cycle order or cyclic numbers one stage different in the cycle order.

Preferably, the identification information generating step is to compare the cyclic numbers included in the chronological identification information of physical blocks storing data in an identical scope of logical addresses to those for data stored in a physical block in which the chronological identification information newly generated is to be written, from the highest priority, to sequentially extract the chronological identification information including a cyclic number in a later stage in the cycle order at each priority, and to terminate the extracting process when the cyclic numbers as comparison targets in the extracting process come to be all in an identical stage; when the extracting process ends up with a result that the cyclic numbers with a priority as comparison targets are cyclic numbers one stage different, a cyclic number posterior in the cycle order is defined as a cyclic number with the priority; when the extracting process ends up with a result that the cyclic numbers with a priority as comparison targets all are in an identical stage, the chronological identification information is generated so that a cyclic number subsequent in the cycle order to the cyclic numbers as the comparison targets is defined as a cyclic number with the priority.

EFFECT OF THE INVENTION

The memory controller, the flash memory system with the memory controller, and the control method of the flash memory according to the present invention are able to accurately determine the chronological relation among physical blocks when there are a plurality of physical blocks storing data in an identical scope of logical addresses in the flash memory as an access target.

DESCRIPTION OF REFERENCE SYMBOLS 1 flash memory system
2 flash memory
3 memory controller
4 host system
6 microprocessor
8 work area
9 buffer
10 flash memory interface block
11 ECC block
13 external bus
14 internal bus
25 user region
26 redundant region
R1 command register
R2 sector count register
R3 LBA register
R11 physical block address register R12 sector number register
R13 counter

DESCRIPTION OF THE PREFERRED EMBODIMENTS

Figure 1:
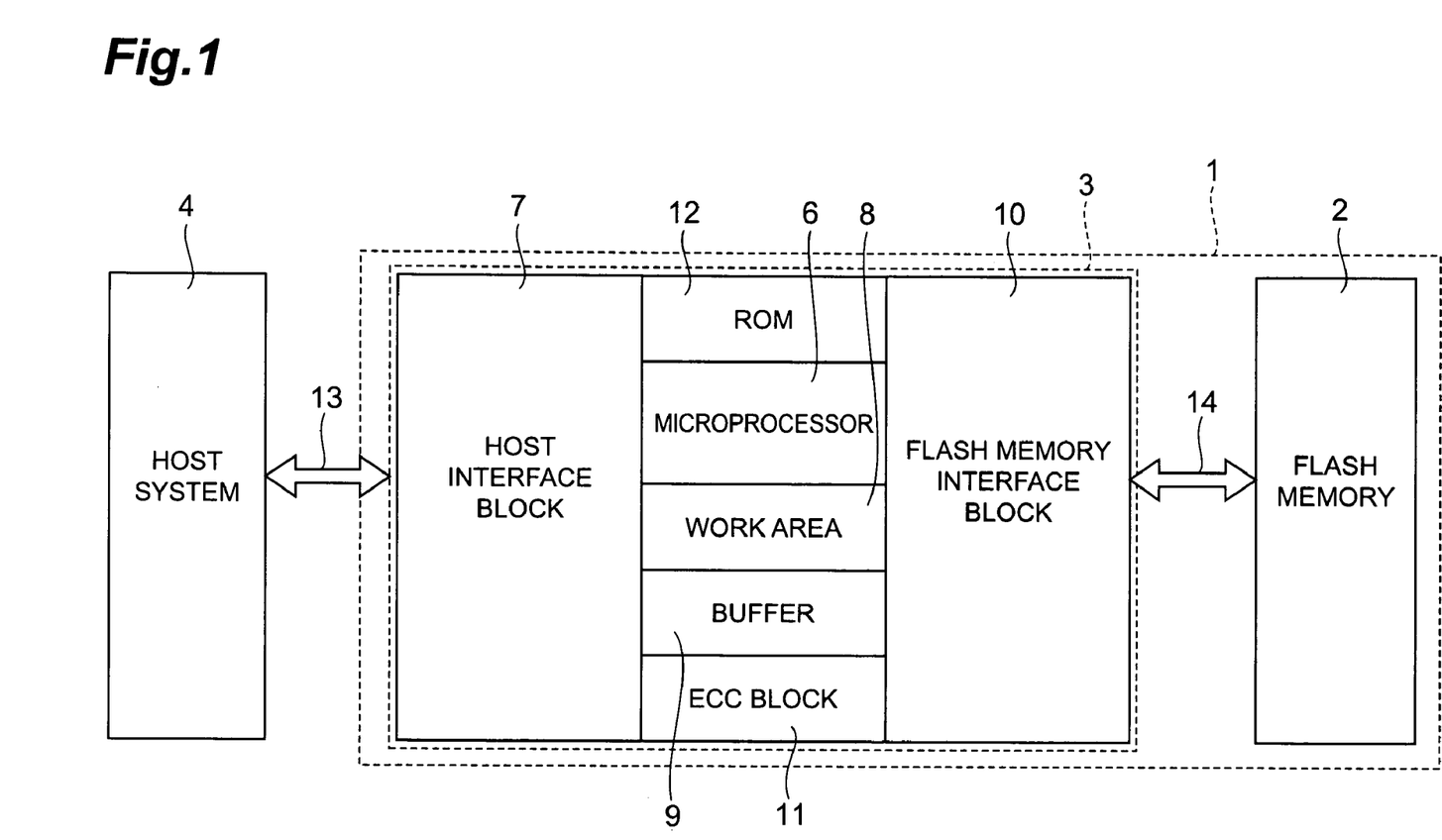
FIG. 1 is a block diagram for schematically explaining an example of the flash memory system according to the present invention.

The preferred embodiments of the memory controller, the flash memory system with the memory controller, and the control method of the flash memory according to the present invention will be described below in detail with reference to the drawings. FIG. 1 is a block diagram schematically showing an example of the flash memory system according to the present invention. As shown in FIG. 1, the flash memory system 1 is comprised of a flash memory 2 and a memory controller 3 for controlling it. The flash memory system 1 is connected through an external bus 13 to a host system 4.

The host system 4 is comprised of a CPU (Central Processing Unit) for controlling the overall operation of the host system 4, a companion chip for exchange of information with the flash memory system 1, and so on. The host system 4 may be any one of various information processing devices, for example, including a personal computer and a digital still camera for processing various types of information such as character, audio, or image information.

The flash memory 2 is a nonvolatile memory and performs duplication of data between a register and memory cells to write or read data.

A memory cell array is provided with a plurality of memory cell groups and word lines. Each memory cell group consists of a plurality of memory cells connected in series. Each word line is a line for selecting a specific memory cell in a memory cell group. An operation to be carried out between a memory cell selected through a word line and a register is duplication of data, i.e., duplication of data from the register into the selected memory cell or duplication of data from the selected memory cell into the register. Namely, data fed from the memory controller 3 is written through the register into the memory cell array and data stored in the memory cell array is supplied through the register to the memory controller 3.

Each of the memory cells constituting the memory cell array is composed of a MOS transistor with two gates. Here one gate is called a control gate and the other a floating gate. Writing of data or erasure of data is implemented by injecting a charge (electrons) into the floating gate or by discharging a charge (electrons) from the floating gate.

Since this floating gate is surrounded by an insulator, injected electrons are held over a long period of time. When electrons are injected into the floating gate, a high voltage to bring the control gate to a higher potential is applied between the control gate and the floating gate. When electrons are discharged from the floating gate, a high voltage to bring the control gate to a lower potential is applied between the control gate and the floating gate.

A state of the floating gate with injected electrons is a written state and corresponds to logical value "0." A state of the floating gate without electrons is an erased state and corresponds to logical value "1."

The address space of the flash memory 2 as described above is composed of "pages" and "blocks (physical blocks)." The pages are processing units in the data reading operation and data writing operation carried out in the flash memory 2. The physical blocks are processing units in the data erasing operation carried out in the flash memory 2 and each physical block is composed of a plurality of pages.

Figure 2:
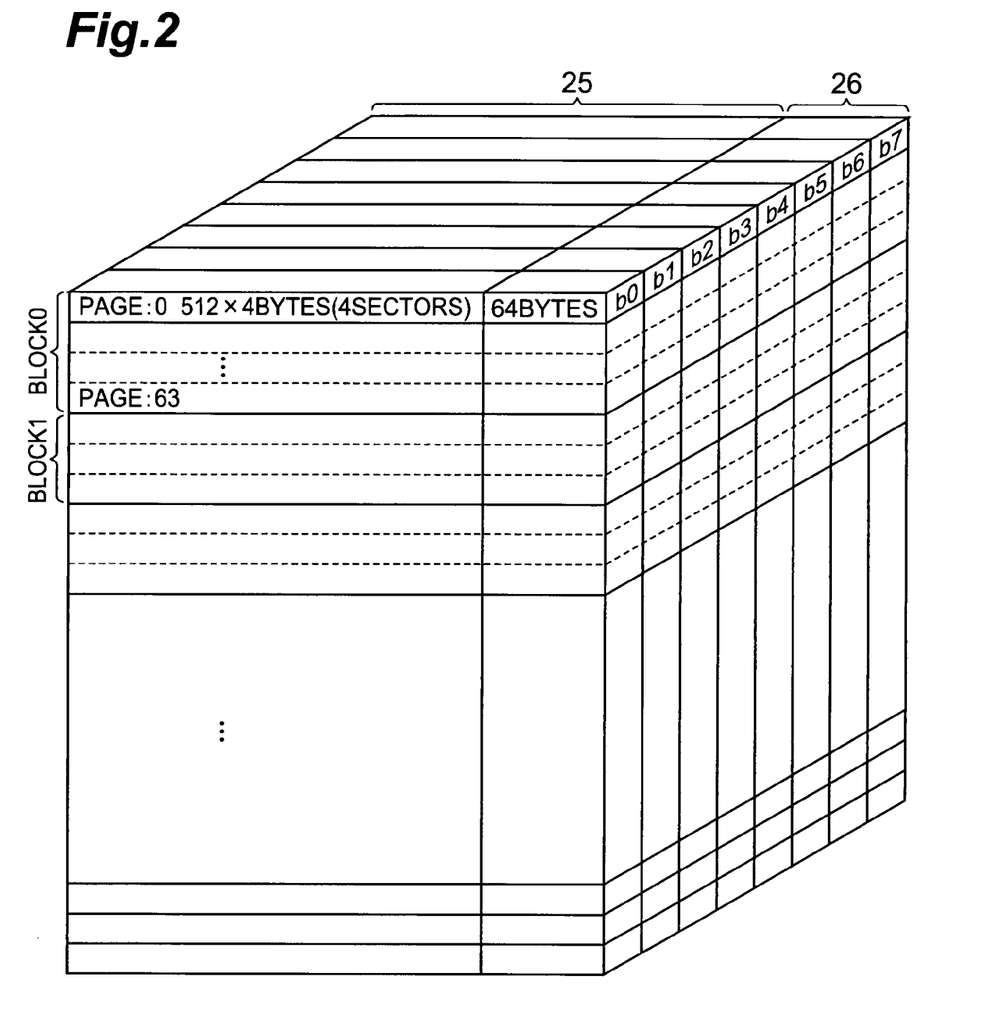
FIG. 2 is a drawing schematically showing a structure of an address space in a flash memory.

FIG. 2 schematically shows the structure of the address space of the flash memory 2, in which one page is composed of a user region 25 of four sectors (2048 bytes) and a redundant region 26 of 64 bytes and in which one physical block is composed of 64 pages. A region of 512 bytes obtained by quartering the user region 25 will be referred to hereinafter as a sector region. The redundant region 26 is also used as suitably divided, and each sector region is assigned a segmental redundant region (which will be referred to hereinafter as a partial redundant region). Namely, this flash memory 2 can be regarded as one composed of 256 sector regions and 256 partial redundant regions assigned to the respective sector regions, per block.

Figure 3:
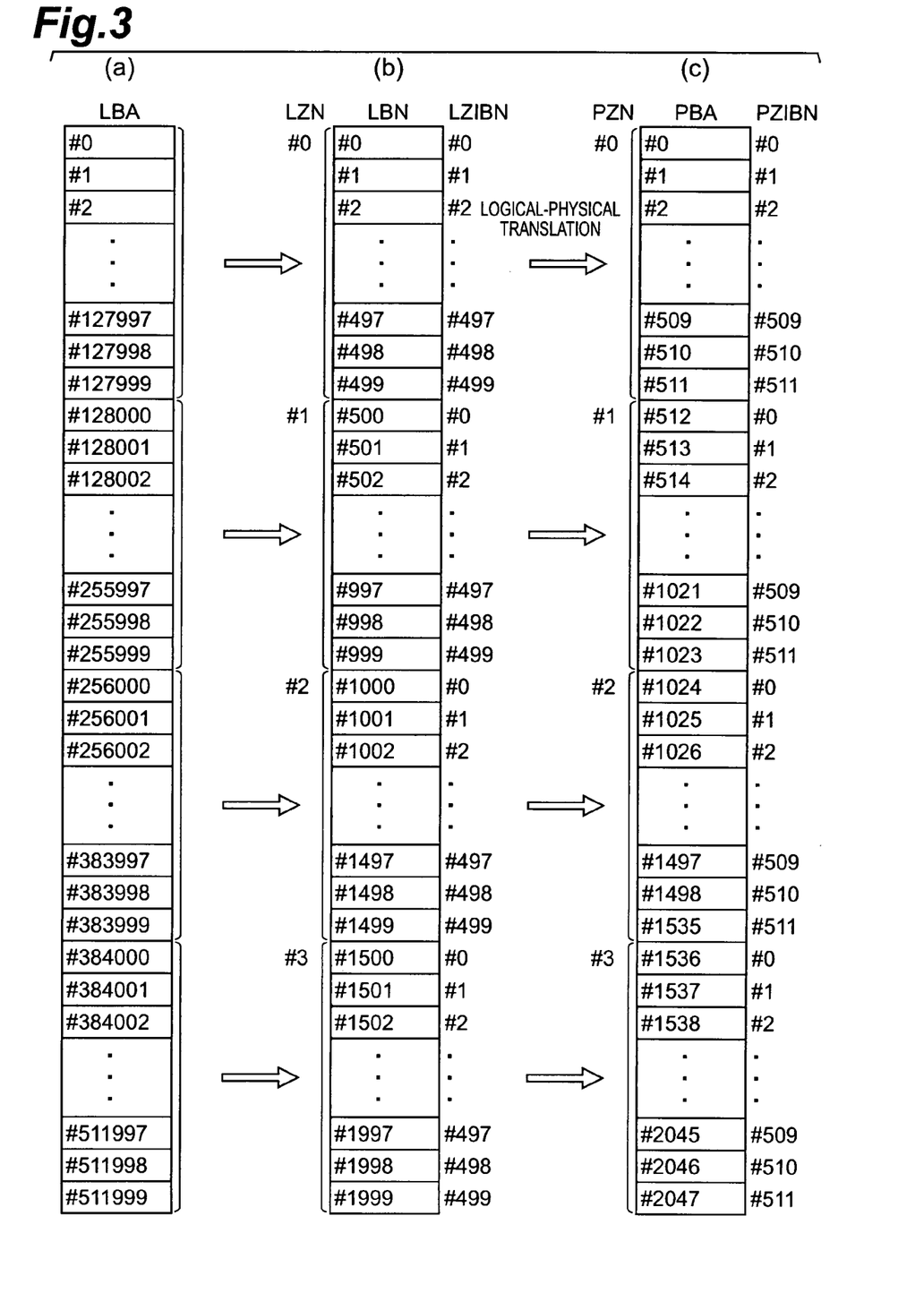
FIG. 3 is a drawing for schematically explaining address translation in a flash memory system.

The physical blocks are assigned their respective unique physical block addresses (PBAs), as shown in FIG. 3(c). Furthermore, when the storage region is administered as divided into a plurality of zones, each physical zone is composed of a plurality of physical blocks and is assigned a unique physical zone number (PZN). A serial number in each physical zone, of a physical block included in each physical zone is called an intra-physical-zone block number (PZIBN).

On the other hand, the address space on the host system 4 side is administered by LBAs (Logical Block Addresses) which are serial numbers assigned to segmental regions of sector (512 bytes) units as shown in FIG. 3(a). Furthermore, a group consisting of a plurality of sectors is called a logical block and a group consisting of a plurality of logical blocks is called as a logical zone. As shown in FIG. 3(b), serial numbers assigned to logical blocks are called logical block numbers (LBNs) and serial numbers assigned to logical zones are called logical zone numbers (LZNs). A serial number in each logical zone, of a logical block included in each logical zone is called an intra-logical-zone block number (LZIBN).

One physical zone is assigned to each logical zone and data corresponding to each logical block included in a logical zone is written into a physical block included in a physical zone assigned to the logical zone. Therefore, the number of sectors included in one logical block is set according to the number of sector regions included in one physical block. However, when one logical block is assigned to a plurality of physical blocks, the plurality of physical blocks are regarded as one physical block and the number of sectors included in one logical block is set according thereto.

Since the example shown in FIG. 3 is based on the flash memory in which one physical block is composed of 256 sector regions, 256 sectors correspond to one logical block. Therefore, the logical zone of LZN#0 composed of 500 logical blocks of LBN#0-#499 corresponds to the region of 128000 sectors of LBA#0-#127999. Likewise, the logical zone of LZN#1 corresponds to the region of 128000 sectors of LBA#128000-#255999,the logical zone of LZN#2 to the region of 128000 sectors of LBA#256000-#383999, and the logical zone of LZN#3 to the region of 128000 sectors of LBA#384000-#511999.

The logical zone of LZN#0 composed of 500 logical blocks of LBN#0-#499 is assigned to the physical zone of PZN#0 composed of 512 physical blocks of PBA#0-#511. Likewise, the logical zone of LZN#1 is assigned to the physical zone of PZN#1, the logical zone of LZN#2 to the physical zone of PZN#2,and the logical zone of LZN#3 to the physical zone of PZN#3. The reason why the number of physical blocks included in each physical zone is larger than the number of logical blocks included in each logical zone is that the following cases are taken into consideration: new data and old data corresponding to the same logical block coexist in different physical blocks; there appears a defective block into which data cannot be normally written, and so on.

Since data of logical blocks assigned to corresponding physical block is written in the order of LBAs into the physical blocks, the correspondence relation between LBAs given from the host system and the access regions in the flash memory can be administered by administering the correspondence relation between physical blocks and logical blocks.

The correspondence relation between physical blocks and logical blocks varies every writing or erasing of data. For this reason, an address administering means creates an address translation table for administration of the correspondence relation between them at each point of time and updates the address translation table upon every change of the correspondence relation. Namely, the address administering means administers the correspondence relation between the logical addresses given from the host system and the physical addresses in the flash memory. The correspondence relation between logical zones and physical zones is preliminarily set, and the address translation table can be created for each logical zone.

This address translation table is created based on information indicating logical blocks written in redundant regions 26 of top pages of physical blocks (which will be referred to hereinafter as logical address information). The logical address information written in the redundant regions 26 is information that specifies the logical blocks, such as LBNs. When the correspondence relation between logical zones and physical zones is preliminarily set, the address translation table can be created based on LZIBNs, and it is thus preferable to use the LZIBNs the data volume of which is lower than that of LBNs.

A block status (flag) indicating whether a physical block is a defective block is written in a redundant region 26 of a top page of the physical block. An error correction code (ECC) of user data written in a corresponding sector region is written in a partial redundant region corresponding to each sector region.

The following will describe the memory controller 3 for processing access to the flash memory 2. The memory controller 3 supplies data, address information, an internal command, etc. to the flash memory 2 to perform such processes as the reading process, the writing process, and the block erasing process.

The internal command herein is a command for the memory controller 3 to instruct the flash memory 2 to execute processing, and the flash memory 2 operates according to the internal command given from the memory controller 3. On the other hand, a command from the host system 4 to the memory controller 3 is called an external command.

The memory controller 3, as shown in FIG. 1, is provided with a microprocessor 6, a host interface block 7, a work area 8, a buffer 9, a flash memory interface block 10, an ECC (error correction code) block 11, and a ROM (Read Only Memory) 12. The memory controller 3 composed of these functional blocks is integrated on one semiconductor chip.

The microprocessor 6 controls the overall operation of the memory controller 3 in accordance with a program stored in the ROM 12. Under this control, the following processes are carried out: a process of generating chronological identification information and a process of discriminating a chronological relation on the basis of the chronological identification information, which will be described later. The memory controller 3 having the microprocessor 6, host interface block 7, work area 8, buffer 9, flash memory interface block 10, and ROM 12 constitutes the address administering means, identification information generating means, writing means, reading means, and chronology determining means.

The ROM 12 is a nonvolatile storage device and stores the program for controlling the overall operation of the memory controller 3, and others. The work area 8 is a work region in which data necessary for control of the flash memory 2 is temporarily saved, and is composed of a plurality of SRAM (Static Random Access Memory) cells. The aforementioned address translation table is created on this work area 8.

The buffer 9 temporarily saves data read out of the flash memory 2 and data to be written into the flash memory 2. Namely, the data read out of the flash memory 2 is retained in the buffer 9 until the host system 4 becomes ready to receive, and the data to be written into the flash memory 2 is retained in the buffer 9 until the flash memory 2 becomes ready to write.

The ECC block 11 generates an error correction code added to the data written into the flash memory 2, and detects and corrects an error included in the read data, based on the error correction code added to the read data.

The host interface block 7 transmits or receives data, address information, an external command, etc. through the external bus 13 to or from the host system 4. The data and others supplied from the host system 4 to the flash memory system 1 are taken through the entrance of host interface block 7 into the interior of the flash memory system 1 (e.g., buffer 9). The data and others supplied from the flash memory system 1 to the host system 4 are supplied through the exit of host interface block 7 to the host system 4.

The flash memory interface block 10 executes various processes such as reading and writing in accordance with a command set (hereinafter referred to as a sequence command) defining the various processes, which is read from the ROM 12 by the microprocessor 6. When the various processes are executed, the flash memory interface block 10 transmits or receives data, address information, status information, an internal command, etc. through the internal bus 14 to or from the flash memory 2.

Figure 4:
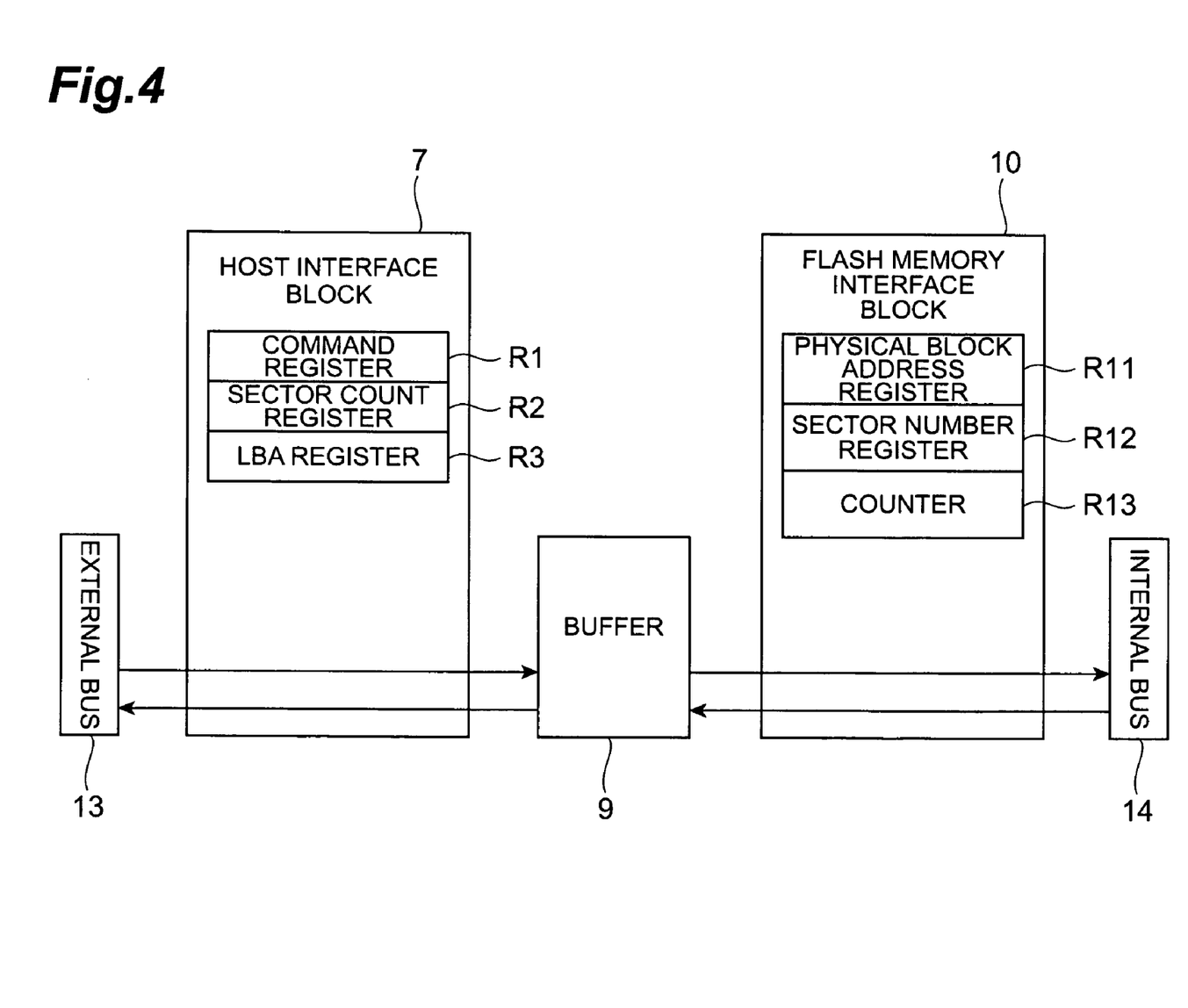
FIG. 4 is a block diagram showing a detailed structure of a host interface block and a flash memory interface block.

The host interface block 7 and flash memory interface block 10 are provided each with various registers as shown in FIG. 4. Namely, the host interface block 7 is provided with a command register R1, a sector count register R2, an LBA register R3, and so on. The flash memory interface block 10 is provided with a physical block address register R11, a sector number register R12, a counter R13, and so on.

Information supplied from the host system 4 is written into the command register R1, sector count register R2, and LBA register R3. An external command such as a writing command or a reading command is written into the command register R1. A sector count of an access target region is written into the sector count register R2. An LBA at the top of the access target region is written into the LBA register R3.

Information to indicate the access target region in the flash memory 2, based on the information written in the sector count register R2 and in the LBA register R3, is written into the physical block address register R11, sector number register R12, and counter R13.

For example, when a region of 256 sectors with continuous LBAs is assigned to one physical block in the flash memory 2 (where one block consists of 64 pages and one page consists of 4 sectors), the low 8 bits of each LBA described in FIG. 3 correspond to a sector number SN as a serial number assigned to a sector in each logical block and the high bits excluding these low 8 bits correspond to a logical block number (LBN).

Namely, when a region of 256 sectors with continuous LBAs is one logical block, the low 8 bits of the LBAs indicate sector numbers SNs (#0-#255) as serial numbers assigned to the respective sectors in the logical block, and the high bits excluding the low 8 bits of the LBAs indicate a logical block number (LBN). The bit counts of LBAs, logical block numbers (LBNs), and sector numbers (SNs) are determined according to the capacity, specifications, etc. of the flash memory 2.

The following will describe information set in the physical block address register R11, in the sector number register R12, and in the counter R13. The part corresponding to the sector numbers SNs of LBAs written in the LBA register R3 is written into the sector number register R12.

Since user data is written in the order of LBAs into each physical block, the foregoing sector numbers SNs correspond to serial numbers assigned to the sector regions included in each physical block. On the other hand, a physical block address (PBA) of a physical block corresponding to the logical block specified based on the part indicating the logical block number (LBN) of the LBAs written in the LBA register R3, or a physical block address (PBA) of an empty block is written into the physical block address register R11.

Namely, when the user data is read out of the physical block corresponding to the specified logical block or when additional data is written into the physical block, the physical block address (PBA) of the physical block corresponding to the specified logical block is written into the physical block address register R11. When the user data corresponding to the specified logical block is written into an empty block, the physical block address (PBA) of the empty block is written into the physical block address register R11. The sector count set in the sector count register R2 is written into the counter R13.

When the access target region specified based on the information set in the LBA register R3 and in the sector count register R2 extends over a plurality of logical blocks, the access target region of physical blocks also extends over a plurality of physical blocks, and the setting of information in the physical block address register R11, in the sector number register R12, and in the counter R13 is also carried out for each logical block.

In the various processes of reading and writing, the sequence command corresponding to the external command set in the command register R1 is read out of the ROM 12 and the flash memory interface block 10 controls the flash memory 2 in accordance with this sequence command.

In the case of the reading process, the flash memory interface block 10 outputs the internal command, address information, etc. and the data read out of the flash memory 2 is retained in the buffer 9. The internal command given herein to the flash memory 2 is an internal command to indicate reading. The address information given to the flash memory 2 is generated based on the set values set in the physical block address register R11 and in the sector number register R12. Every time data of one sector is read out of the flash memory 2, the set value in the sector number register R12 is incremented (one added) and the set value in the counter R13 is decremented (one subtracted); next address information is then generated based on the incremented set value in the sector number register R12. The data stored in the buffer 9 is provided through the host interface block 7 and external bus 13 to the host system 4.

This reading process is terminated when the set value in the counter R13 reaches "0." Namely, in this reading process, data of the sector count first set in the counter R13 is read out in order from sector regions corresponding to the set value first set in the sector number register R12.

In the case of the writing process, the flash memory interface block 10 outputs the internal command, address information, etc. and data to be written in the flash memory 2 is supplied from the buffer 9 to the flash memory 2. The internal command supplied herein to the flash memory 2 is an internal command to indicate writing. The address information supplied to the flash memory 2 is generated based on the set values set in the physical block address register R11 and in the sector number register R12.

This writing process is terminated when the set value in the counter R13 reaches "0," as is the case in the reading process. Namely, in this writing process, data of the sector count first set in the counter R13 is written in order from the sector region corresponding to the set value first set in the sector number register R12.

The following will describe a case where there are a plurality of physical blocks to which the same scope of LBAs are assigned, i.e., a case where there are a plurality of physical blocks corresponding to a logical block with the same LBN. The flash memory does not allow rewriting of data and data is erased in units of blocks. In a normal rewriting process, therefore, new data has to be written into another physical block in an erased state. In this respect, if data not replaced with the new data is transferred from the original physical block to the physical block into which the new data is written, the data stored in the original physical block can be erased. In certain cases, however, these physical blocks are allowed to coexist, without execution of the above-described transfer. In such cases, there exist a plurality of physical blocks corresponding to the logical block with the same LBN, and thus there are also a plurality of data corresponding to the same LBA.

When the data corresponding to the same LBA exist in different physical blocks, the newest data is discriminated based on the sequence of writing of data into the physical blocks. Therefore, the writing means writes information for determining the sequence of writing (which will be referred to hereinafter as chronological identification information), into the physical blocks into which the data is written. The writing means writes the chronological identification information corresponding to the data written in the physical blocks, into the physical blocks in which the data supplied from the host system 4 is written. How many physical blocks corresponding to the logical block with the same LBN are allowed to coexist can be suitably set in view of the number of logical blocks included in a logical zone, the number of physical blocks included in a physical zone corresponding thereto, and so on.

When the number of physical blocks corresponding to the logical block with the same LBN reaches an allowable coexistence number, data stored in any one of those physical blocks must be erased. When this erasure is carried out, effective data stored in the physical block as an erasing target (data not replaced with data of another physical block) must be transferred to another physical block not being an erasing target (a physical block corresponding to the logical block with the same LBN). Since the volume of effective data stored in each physical block or the like is taken into consideration on the occasion of selecting the physical block as an erasing target, it is, therefore, not always the case that the data is erased in order from the physical block storing the oldest data on the basis of the sequence of writing.

The following will describe the chronological identification information which is information for discriminating the chronological relation of data stored in physical blocks.

In the example shown in Table 1 below, each chronological identification information includes four cyclic numbers. These four cyclic numbers are given priorities and each cyclic number is a 2-bit value and loops back after an advance of four stages (or circulates in the order of 0, 1, 2, 3,and 0). The sequence relation of cyclic numbers is determined according to the cycle order of cyclic numbers and a later number in the sequence relation corresponds to a newer number in the chronological relation. The number of cyclic numbers is set to a number resulting from subtraction of 1 from the allowable coexistence number of physical blocks corresponding to the logical block with the same LBN. Namely, in the case of four cyclic numbers, up to five physical blocks can coexist corresponding to the logical block with the same LBN.

The same logical block is assigned to the physical blocks with PZIBNs of #A, #B, #C, #D, and #E shown in Table 1. The below will describe a method of discriminating the chronological relation of data stored in these physical blocks, based on the chronological identification information given to each physical block. In the description below, the chronological identification information given to the physical block with PZIBN of #A is abbreviated to chronological identification information of #A.

TABLE 1

| Priority | #A | #B | #C | #D | #E |
|---|---|---|---|---|---|
| 1 | 0 | 1 | 1 | 1 | 1 |
| 2 | 0 | 0 | 1 | 1 | 1 |
| 3 | 0 | 0 | 0 | 1 | 1 |
| 4 | 0 | 0 | 0 | 0 | 1 |

First, the chronological relation of the chronological identification information of #A, #B, #C, #D, and #E is discriminated based on the cyclic numbers with the first priority. Since the cyclic number with the first priority in the chronological identification information of #A is "0" and the cyclic number with the first priority in the chronological identification information of #B, #C, #D, and #E is "1, " it is determined that the chronological identification information of #B, #C, #D, and #E is newer than the chronological identification information of #A.

For the chronological identification information having the same cyclic number with the first priority, the chronological relation is further discriminated based on the cyclic numbers with the second priority. Namely, the chronological relation of the chronological identification information of #B, #C, #D, and #E is discriminated based on the cyclic numbers with the second priority. Since the cyclic number with the second priority in the chronological identification information of #B is "0" and the cyclic number with the second priority in the chronological identification information of #C, #D, and #E is "1, " it is determined that the chronological identification information of #C, #D, and #E is newer than the chronological identification information of #B.

For the chronological identification information having the same cyclic numbers with the first and second priorities, the chronological relation is further discriminated based on the cyclic numbers with the third priority. Namely, the chronological relation of the chronological identification information of #C, #D, and #E is discriminated based on the cyclic numbers with the third priority. Since the cyclic number with the third priority in the chronological identification information of #C is "0" and the cyclic number with the third priority in the chronological identification information of #D and #E is "1," it is determined that the chronological identification information of #D and #E is newer than the chronological identification information of #C.

For the chronological identification information having the same cyclic numbers with the first to third priorities, the chronological relation is further discriminated based on the cyclic numbers with the fourth priority. Namely, the chronological relation of the chronological identification information of #D and #E is discriminated based on the cyclic numbers with the fourth priority. Since the cyclic number with the fourth priority in the chronological identification information of #D is "0" and the cyclic number with the fourth priority in the chronological identification information of #E is "1, " it is determined that the chronological identification information of #E is newer than the chronological identification information of #D.

As described above, the cyclic numbers included in the chronological identification information are compared in order from the highest priority, whereby the chronological relation of the chronological identification information of #A, #B, #C, #D, and #E is found to be ordered in the following sequence from the newest: the chronological identification information of #E, the chronological identification information of #D, the chronological identification information of #C, the chronological identification information of #B, and the chronological identification information of #A. In this way, the reading means composed of the memory controller 3 including the processor 6 reads the chronological identification information written by the writing means, and when there are a plurality of physical blocks storing data in the same scope of logical addresses (physical blocks with PZIBNs of #A, #B, #C, #D, and #E), the chronology determining means determines the chronological relation of these physical blocks on the basis of the sequence of cyclic numbers with each priority included in the chronological identification information. In the same manner, thereafter, the reading means reads the chronological identification information and the chronology determining means determines the chronological relation of a plurality of physical blocks.

The following will describe how to discriminate the chronological relation of the chronological identification information of #A, #B, #C, #D, and #E as shown in Table 2.

TABLE 2

| Priority | #A | #B | #C | #D | #E |
|---|---|---|---|---|---|
| 1 | 3 | 3 | 0 | 0 | 0 |
| 2 | 1 | 2 | 0 | 1 | 1 |
| 3 | 0 | 0 | 0 | 0 | 1 |
| 4 | 0 | 0 | 0 | 0 | 0 |

First, the chronological relation of the chronological identification information of #A, #B, #C, #D, and #E is discriminated based on the cyclic numbers with the first priority. Since the cyclic number with the first priority in the chronological identification information of #A and #B is "3" and the cyclic number with the first priority in the chronological identification information of #C, #D, and #E is "0," it is determined that the chronological identification information of #C, #D, and #E is newer than that of #A and #B.

For the chronological identification information having the same cyclic number with the first priority, the chronological relation is further discriminated based on the cyclic numbers with the second priority. Namely, the chronological relation of the chronological identification information of #A and #B, and the chronological relation of the chronological identification information of #C, #D, and #E each are discriminated based on the cyclic numbers with the second priority. Since the cyclic number with the second priority in the chronological identification information of #A is "1" and the cyclic number with the second priority in the chronological identification information of #B is "2," it is determined that the chronological identification information of #B is newer than that of #A. Since the cyclic number with the second priority in the chronological identification information of #C is "0" and the cyclic number with the second priority in the chronological identification information of #D and #E is "1," it is determined that the chronological identification information of #D and #E is newer than that of #C.

For the chronological identification information having the same cyclic numbers with the first and second priorities, the chronological relation is further discriminated based on the cyclic numbers with the third priority. Namely, the chronological relation of the chronological identification information of #D and #E is discriminated based on the cyclic numbers with the third priority. Since the cyclic number with the third priority in the chronological identification information of #D is "0" and the cyclic number with the third priority in the chronological identification information of #E is "1," it is determined that the chronological identification information of #E is newer than that of #D.

As described above, the cyclic numbers included in the chronological identification information are compared in order from the highest priority, whereby the chronological relation of the chronological identification information of #A, #B, #C, #D, and #E is found to be ordered in the following order from the newest: the chronological identification information of #E, the chronological identification information of #D, the chronological identification information of #C, the chronological identification information of #B, and the chronological identification information of #A.

As described above, when the chronological relation is determined based on the chronological identification information, the chronological relation is determined in order from the cyclic numbers with the highest priority; for the chronological identification information having the same cyclic number with a higher priority, the chronological relation of the chronological identification information is discriminated based on cyclic numbers with a lower priority. Therefore, comparison targets at each priority are only the chronological identification information having the same cyclic number with a priority higher than the priority of interest. For example, when the chronological relation is discriminated by comparing cyclic numbers with the third priority, the comparison targets are the chronological identification information having the same cyclic numbers with the first and second priorities.

The following will describe a method of generating the chronological identification information to be given to the physical block with PZIBN of #E assigned the same logical block as the physical blocks with PZIBNs of #A, #B, #C, and #D shown in Table 3. The generation of the chronological identification information is carried out by the identification information generating means. Namely, the chronological identification information is information for discriminating the chronological relation of physical blocks storing the data in the same scope of logical addresses (physical blocks with PZIBNs of #A, #B, #C, #D, and #E), and information containing a plurality of cyclic numbers with priorities.

TABLE 3

| Priority | #A | #B | #C | #D | #E |
|---|---|---|---|---|---|
| 1 | 0 | 0 | 1 | 1 | 1 |
| 2 | 0 | 1 | 0 | 1 | 1 |
| 3 | 0 | 1 | 0 | 1 | 2 |
| 4 | 0 | 1 | 0 | 0 | 0 |

First, the cyclic numbers with the first priority of the chronological identification information of #A, #B, #C, and #D are compared, the chronological identification information of #C and #D newer in the chronological relation is extracted, and the cyclic number with the first priority in the chronological identification information of #C and #D is set as a cyclic number with the first priority in the chronological identification information of #E. Namely, when the cyclic number with the first priority in the chronological identification information of #E is generated, the comparison targets are the cyclic numbers with the first priority in the chronological identification information of #A, #B, #C, and #D, and, since these cyclic numbers include the cyclic number "0" and cyclic number "1" one stage different in the cycle order, the cyclic number "1" one stage after in the cycle order is determined to be the cyclic number with the first priority in the chronological identification information of #E.

The next comparison is made between the cyclic numbers with the second priority in the chronological identification information on the newer side of the chronological relation extracted based on the cyclic numbers with the first priority (the chronological identification information of #C and #D), the chronological identification information of #D newer in the chronological relation is extracted, and the cyclic number with the second priority in the chronological identification information of #D is set as a cyclic number with the second priority in the chronological identification information of #E. Namely, when the cyclic number with the second priority in the chronological identification information of #E is generated, the comparison targets are the cyclic numbers with the second priority in the chronological identification information of #C and #D, and, since these cyclic numbers include the cyclic number "0" and cyclic number "1" one stage different in the cycle order, the cyclic number "1" one stage after in the cycle order is determined to be the cyclic number with the second priority in the chronological identification information of #E.

Since there is only one chronological identification information on the newer side of the chronological relation extracted based on the cyclic numbers with the first and second priorities (i.e., the chronological identification information of #D), a cyclic number subsequent to the cyclic number with the third priority in the newer chronological identification information is set as a cyclic number with the third priority in the chronological identification information of #E. Namely, when the cyclic number with the third priority in the chronological identification information of #E is generated, the comparison target is only the cyclic number with the third priority in the chronological identification information of #D, and, since the comparison target is only the cyclic number "1, " the cyclic number "2" subsequent to the cyclic number "1" is determined to be the cyclic number with the third priority in the chronological identification information of #E.

Since there is only one chronological identification information as a comparison target in the comparison of the cyclic number with the third priority, no comparison is made as to the cyclic numbers with the fourth priority, and "0" is set as a cyclic number with the fourth priority in the chronological identification information of #E.

The chronological identification information of #E generated in this manner is written into the redundant region of the physical block with PZIBN of #E.

The following will describe a method of generating the chronological identification information to be given to the physical block with PZIBN of #E assigned the same logical block as the physical blocks with PZIBNs of #A, #B, #C, and #D shown in Table 4.

TABLE 4

| Priority | #A | #B | #C | #D | #E |
|---|---|---|---|---|---|
| 1 | 0 | 1 | 1 | 1 | 1 |
| 2 | 0 | 1 | 1 | 1 | 2 |
| 3 | 0 | 1 | 2 | 2 | 0 |
| 4 | 0 | 0 | 0 | 1 | 0 |

First, a comparison is made among the cyclic numbers with the first priority in the chronological identification information of #A, #B, #C, and #D, the chronological identification information of #B, #C, and #D newer in the chronological relation is extracted, and the cyclic number with the first priority in the chronological identification information of #B, #C, and #D is set as a cyclic number with the first priority in the chronological identification information of #E. Namely, when the cyclic number with the first priority in the chronological identification information of #E is generated, the comparison targets are the cyclic numbers with the first priority in the chronological identification information of #A, #B, #C, and #D, and, since these cyclic numbers include the cyclic number "0" and cyclic number "1" one stage different in the cycle order, the cyclic number "1" one stage after in the cycle order is determined to be the cyclic number with the first priority in the chronological identification information of #E.

The next comparison is made among the cyclic numbers with the second priority in the chronological identification information on the newer side of the chronological relation extracted based on the cyclic number with the first priority (i.e., the chronological identification information of #B, #C, and #D), and, since the cyclic numbers of the comparison targets (cyclic numbers with the second priority in the chronological identification information of #B, #C, and #D) all are identical, the cyclic number subsequent to the cyclic number of the targets is set as a cyclic number with the second priority in the chronological identification information of #E. Namely, when the cyclic number with the second priority in the chronological identification information of #E is generated, the comparison targets are the cyclic numbers with the second priority in the chronological identification information of #B, #C, and #D, and, since these cyclic numbers all are the cyclic number "1" in the same stage, the cyclic number "2" subsequent to the cyclic number "1" is determined to be the cyclic number with the second priority in the chronological identification information of #E.

Since the comparison targets all are the same chronological identification information in the comparison among the cyclic numbers with the second priority, no comparison is made among the cyclic numbers with the third and fourth priorities, and "0" is set as cyclic numbers with the third and fourth priorities in the chronological identification information of #E.

The chronological identification information of #E generated in this manner is written into the redundant region of the physical block with PZIBN of #E.

As described above, when new chronological identification information is generated, the cyclic numbers are compared in order from the cyclic numbers with the highest priority and the chronological identification information newest in the chronological relation is successively extracted; when the chronological identification information newest in the chronological relation is extracted, the cyclic number with the priority as a comparison target in the extraction of the extracted chronological identification information is determined to be the cyclic number with the priority in the newly generated chronological identification information. For example, when the chronological identification information newest in the chronological relation is extracted based on the cyclic numbers with the second priority, the cyclic number with the second priority in the extracted chronological identification information becomes the cyclic number with the second priority in the newly generated chronological identification information. In a comparison among cyclic numbers with each priority, comparison targets are only chronological identification information extracted based on cyclic numbers with a higher priority than the priority of interest. For example, in a comparison among cyclic numbers with the third priority, comparison targets are only the chronological identification information extracted based on the cyclic numbers with the first and second priorities.

When the cyclic numbers with the priority in the comparison of the chronological identification information as comparison targets all reach the same stage (including a case where there is only one chronological identification information as a comparison target, no further extraction is carried out, the extraction process is terminated, and the cyclic number subsequent to the same cyclic number is determined to be the cyclic number with the priority in the newly generated chronological identification information. For example, when the cyclic numbers with the third priority in the chronological identification information extracted based on the cyclic numbers with the first and second priorities all are the same, the cyclic number subsequent to the cyclic number with the third priority in the extracted chronological identification information is determined to be the cyclic number with the third priority in the newly generated chronological identification information. Furthermore, when there is only one chronological identification information extracted based on the cyclic numbers with the first and second priorities, the cyclic number subsequent to the cyclic number with the third priority in the chronological identification information is determined to be the cyclic number with the third priority in the newly generated chronological identification information.

Using the chronological identification information generated in this manner, the chronological relation can be properly discriminated based on the chronological identification information even if any physical block is erased out of the physical blocks with PZIBNs of #A, #B, #C, #D, and #E. Namely, as the chronological relation is determined in order from the cyclic numbers with the highest priority in order to discriminate the chronological relation of the chronological identification information, the cyclic numbers as comparison targets at each priority are always cyclic numbers in the same stage in the cycle order or cyclic numbers one stage different in the cycle order.

Figure 5:
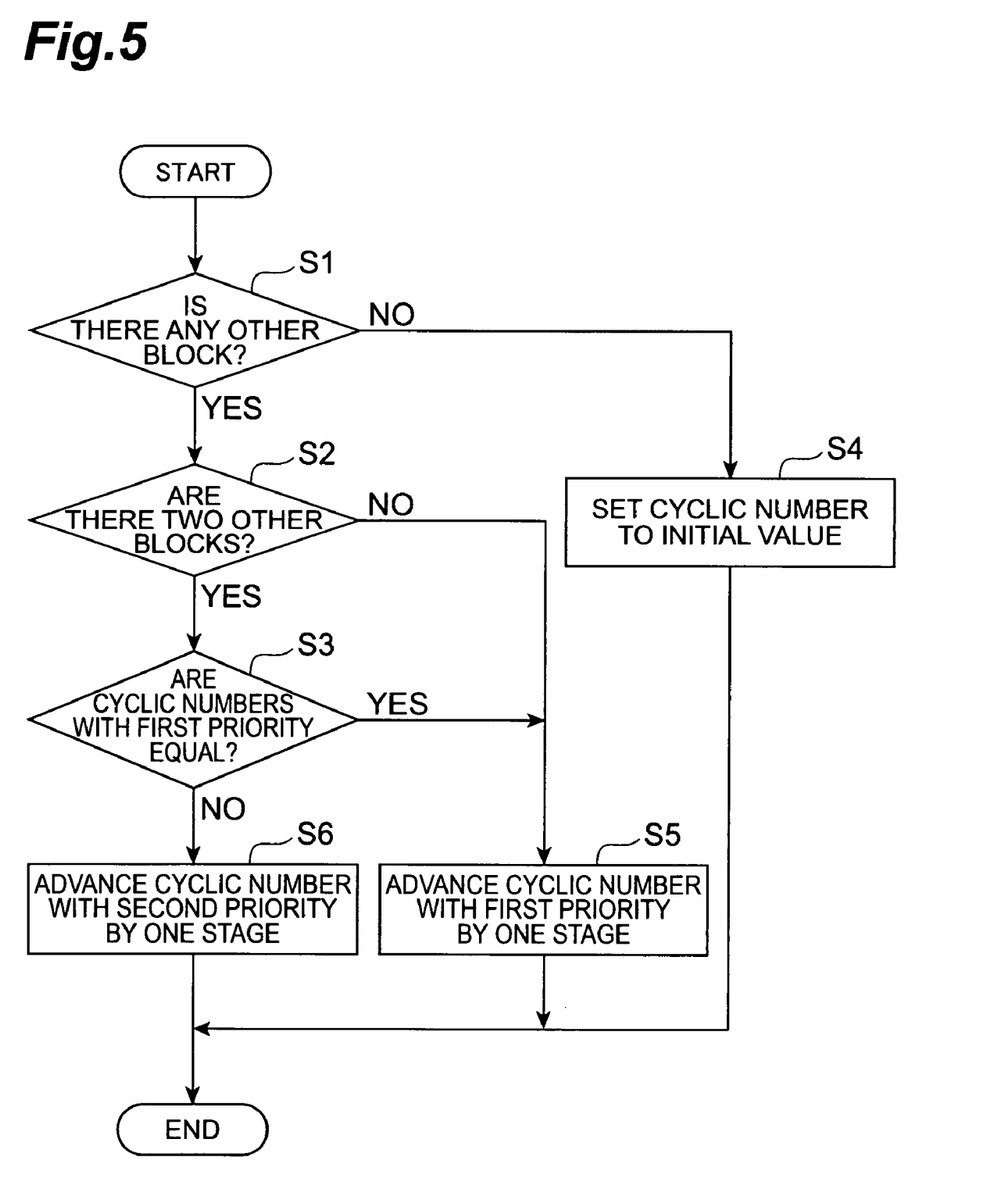
FIG. 5 is a flowchart for explaining a method of generating chronological identification information.

The following will describe a method of generating the chronological identification information in a case where the chronological identification information includes two cyclic numbers, with reference to the flowchart of FIG. 5. When the chronological identification information contains two cyclic numbers, up to three physical blocks can coexist corresponding to a logical block with the same LBN. Therefore, when new chronological identification information is generated, there are a case where no physical block exists to which the same logical block is assigned as a physical block to be given the generated chronological identification information, and cases where one or two physical blocks exist. When there become three physical blocks assigned the same logical block, data stored in one physical block out of them is erased. In this case, effective data stored in the physical block subjected to erasing (data not replaced with data in another physical block) is transferred to either of the other two physical blocks.

When the chronological identification information contains two cyclic numbers, i.e., when up to three physical blocks are allowed corresponding to a logical block with the same LBN, it is relatively easy to generate the chronological identification information.

The first step is to determine whether there is any physical block assigned the same logical block as the physical block to be given the generated chronological identification information (step S1). When there is a physical block or physical blocks assigned the same logical block as the physical block to be given the generated chronological identification information (step S1: Yes), it is then determined whether there are two physical blocks (step S2). When there are two physical blocks assigned the same logical block as the physical block to be given the generated chronological identification information (step S2: Yes), it is further determined whether cyclic numbers with the first priority given to the two physical blocks are identical with each other (step S3).

When there is no physical block assigned the same logical block as the physical block to be given the generated chronological identification information (step S1: No, which corresponds to (Table 5) described later), the chronological identification information is generated by setting the values of the cyclic number with the first priority and the cyclic number with the second priority to the initial value of "0" (step S4). It is noted that the initial values of the cyclic numbers can be arbitrarily set.

When there is only one physical block assigned the same logical block as the physical block to be given the generated chronological identification information (step S2: No, which corresponds to (Table 6) described later) or when two physical blocks assigned the same logical block as the physical block to be given the generated chronological identification information have the same cyclic number with the first priority (step S3: Yes, which corresponds to (Table 9) described later), the chronological identification information is generated by setting the value subsequent in the cycle order to the cyclic number with the first priority of the physical block assigned the same logical block as the physical block to be given the generated chronological identification information, as a cyclic number with the first priority in the generated chronological identification information (step S5). On this occasion, the value of the cyclic number with the second priority is determined to be the initial value of "0."

When the cyclic numbers with the first priority of two physical blocks assigned the same logical block as the physical block to be given the generated chronological identification information are values one stage different in the cycle order (step S3: No, which corresponds to (Table 7) and (Table 8) described later), the chronological identification information is generated by setting the value subsequent in the cycle order to the cyclic number with the second priority in the chronological identification information after the one-stage advance of the cyclic number with the first priority, as a cyclic number with the second priority (step S6). On this occasion, the value of the cyclic number with the first priority is set to be the same as the chronological identification information after the one-stage advance of the cyclic number with the first priority.

The following will specifically describe a method of generating the chronological identification information in a case where the chronological identification information contains two cyclic numbers.

When there is no physical block assigned the same logical block as the physical block to be given the generated chronological identification information, the chronological identification information is generated by setting "0" to the cyclic number with the first priority and the cyclic number with the second priority like the chronological identification information of #A shown in Table 5.

TABLE 5

| Priority | #A |
|---|---|
| 1 | 0 |
| 2 | 0 |

When the chronological identification information is generated as information to be given to the physical block with PZIBN of #B assigned the same logical block as the physical block with PZIBN of #A shown in Table 6, the cyclic number with the first priority is advanced by one stage according to the cycle order. Namely, the chronological identification information generated is information having the cyclic number with the first priority of "1" and the cyclic number with the second priority of "0" like the chronological identification information of #B shown in Table 6.

TABLE 6

| Priority | #A | #B |
|---|---|---|
| 1 | 0 | 1 |
| 2 | 0 | 0 |

When the chronological identification information generated is that to be given to the physical block with PZIBN of #C assigned the same logical block as the physical blocks with PZIBNs of #A and #B shown in Table 7, the cyclic number with the second priority in the chronological identification information of #B (chronological identification information after the one-stage advance of the cyclic number with the first priority) is advanced by one stage according to the cycle order. Namely, the chronological identification information is generated so as to have the cyclic number with the first priority of "1" and the cyclic number with the second priority of "1" like the chronological identification information of #C shown in Table 7.

TABLE 7

| Priority | #A | #B | #C |
|---|---|---|---|
| 1 | 0 | 1 | 1 |
| 2 | 0 | 0 | 1 |

Since there are three physical blocks assigned the same logical block herein, there remain the physical blocks with PZIBNs of #A and #C if data stored in the physical block with PZIBN of #B is erased. When the data stored in the physical block with PZIBN of #B is erased, effective data stored in the physical block with PZIBN of #B (data not replaced with data in another physical block) is transferred to the physical block with PZIBN of #C.

When the chronological identification information to be generated is that to be given to the physical block with PZIBN of #D assigned the same logical block as the physical blocks with PZIBNs of #A and #C shown in Table 8, the cyclic number with the second priority in the chronological identification information of #C (chronological identification information after the one-stage advance of the cyclic number with the first priority) is advanced by one stage according to the cycle order. Namely, the chronological identification information is generated so as to have the cyclic number with the first priority of "1" and the cyclic number with the second priority of "2" like the chronological identification information of #D shown in Table 8.

TABLE 8

| Priority | #A | #C | #D |
|---|---|---|---|
| 1 | 0 | 1 | 1 |
| 2 | 0 | 1 | 2 |

Since there are three physical blocks assigned the same logical block, there remain the physical blocks with PZIBNs of #C and #D if data stored in the physical block with PZIBN of #A is erased. When the data stored in the physical block with PZIBN of #A is erased, effective data stored in the physical block with PZIBN of #A (data not replaced with data in another physical block) is transferred to the physical block with PZIBN of #C.

When the chronological identification information to be generated is that to be given to the physical block with PZIBN of #E assigned the same logical block as the physical blocks with PZIBNs of #C and #D shown in Table 9, the cyclic number with the first priority in the chronological identification information of #C and #D is advanced by one stage according to the cycle order. Namely, the chronological identification information is generated so as to have the cyclic number with the first priority of "2" and the cyclic number with the second priority of "0" like the chronological identification information of #E shown in Table 9.

TABLE 9

| Priority | #C | #D | #E |
|---|---|---|---|
| 1 | 1 | 1 | 2 |
| 2 | 1 | 2 | 0 |

When the chronological identification information includes two cyclic numbers, the chronological relation of the chronological identification information can also be discriminated by determining the chronological relation in order from the cyclic numbers with the highest priority.

For example, when the chronological relation is discriminated among the chronological identification information of #A, #C, and #D shown in Table 8, the chronological relation is first determined between the chronological identification information of #A and the chronological identification information of #C and #D, based on the cyclic numbers with the first priority, and, subsequently, the chronological relation is determined between the chronological identification information of #C and the chronological identification information of #D, based on the cyclic numbers with the second priority. Furthermore, when the chronological relation is discriminated among the chronological identification information of #C, #D, and #E shown in Table 9, the chronological relation is first determined between the chronological identification information of #C and #D and the chronological identification information of #E, based on the cyclic numbers with the first priority, and, subsequently, the chronological relation is determined between the chronological identification information of #C and the chronological identification information of #D, based on the cyclic numbers with the second priority.

As described above, when the chronological identification information including a plurality of cyclic numbers with priorities is generated in the above-described manner, the cyclic numbers as comparison targets at each priority become cyclic numbers in the same stage in the cycle order or cyclic numbers one stage different in the cycle order. Therefore, even if the erasing process is not carried out in the chronological order from the oldest for the physical blocks storing the data in the same scope of logical addresses, the chronological relation thereof can be accurately determined.

It is noted that the following items can be arbitrarily set: the number of cyclic numbers included in the chronological identification information, the number of stages in a cycle of the cyclic numbers, the cycle order (increase or decrease) of the cyclic numbers, and the initial values of the respective cyclic numbers. Concerning the number of cyclic numbers included in the chronological identification information, when the allowable number of physical blocks storing data in the same scope of logical addresses is n, the number of cyclic numbers included in the chronological identification information can be at least (n−1). The number of stages in a cycle of the cyclic numbers can be 3 or more.

What is claimed is:

1. A memory controller for controlling access to a flash memory in which stored data is erased in units of physical blocks, according to information supplied from a host system, the memory controller comprising:

address administering means for administering a correspondence relation between logical addresses supplied from the host system and physical addresses in the flash memory;

identification information generating means for generating a plurality of chronological identification information which is information to discriminate a chronological relation of a plurality of physical blocks storing data in an identical scope of logical addresses and which is information including a plurality of cyclic numbers each having priority;

writing means for writing in a physical block in which data supplied from the host system is written, the chronological identification information corresponding to the data written in the physical block;

reading means for reading the chronological identification information written by the writing means; and chronology determining means for determining, when there are the plurality of physical blocks storing data in an identical scope of logical addresses, the chronological relation of the plurality of physical blocks, based on the chronological identification information;

wherein the chronology determining means determines the chronological relation of the plurality of the physical blocks by comparing the plurality of chronological identification information corresponding to the plurality of physical blocks;

wherein in comparison of the plurality of chronological identification information, the cyclic numbers with an identical priority included in the plurality of chronological identification information are compared in order from the highest priority to the lowest priority; and wherein the chronological identification information is generated as follows: when cyclic numbers included in the plurality of chronological identification information are compared at each priority, cyclic numbers as comparison targets at each priority become cyclic numbers in an identical stage in a cycle order or cyclic numbers one stage different in the cycle order.

2. The memory controller according to claim 1, wherein the identification information generating means compares cyclic numbers included in the plurality of chronological identification information of physical blocks storing data in an identical scope of logical addresses to those for data stored in a physical block in which chronological identification information newly generated is to be written, in order from the highest priority to the lowest priority;

wherein the identification information generating means sequentially extracts chronological identification information including a cyclic number in a later stage in the cycle order at each priority from the plurality of chronological identification information;

wherein the identification information generating means terminates the extracting process when cyclic numbers as comparison targets in the extracting process come to be all in an identical stage;

wherein when cyclic numbers as comparison targets in the extracting process corresponding to each priority are cyclic numbers one stage different in the cycle order, a cyclic number in a later stage in the cycle order is defined as a cyclic number with the priority included in the chronological identification information newly generated; and wherein when all cyclic numbers as comparison targets are cyclic numbers in an identical stage in the cycle order, a cyclic number subsequent in the cycle order to the cyclic numbers in the identical stage is defined as a cyclic number with the priority included in the chronological identification information newly generated.

3. The memory controller according to claim 1, wherein when an allowable number of physical blocks storing data in an identical scope of logical addresses is a positive integer n, a number of cyclic numbers included in the chronological identification information is set to (n−1).

4. The memory controller according to claim 2, wherein when an allowable number of physical blocks storing data in an identical scope of logical addresses is a positive integer n, a number of cyclic numbers included in the chronological identification information is set to (n−1).

5. A flash memory system comprising a memory controller and a flash memory;

wherein, the memory controller for controlling access to a flash memory in which stored data is erased in units of physical blocks, according to information supplied from a host system, comprising:

address administering means for administering a correspondence relation between logical addresses supplied from the host system and physical addresses in the flash memory;

identification information generating means for generating a plurality of chronological identification information which is information to discriminate a chronological relation of a plurality of physical blocks storing data in an identical scope of logical addresses and which is information including a plurality of cyclic numbers each having priority;

writing means for writing in a physical block in which data supplied from the host system is written, the chronological identification information corresponding to the data written in the physical block;

reading means for reading the chronological identification information written by the writing means; and chronology determining means for determining, when there are the plurality of physical blocks storing data in an identical scope of logical addresses, the chronological relation of the plurality of physical blocks, based on the chronological identification information;

wherein the chronology determining means determines the chronological relation of the plurality of the physical blocks by comparing the plurality of chronological identification information corresponding to the plurality of physical blocks;

wherein in comparison of the plurality of chronological identification information, the cyclic numbers with an identical priority included in the plurality of chronological identification information are compared in order from the highest priority to the lowest priority; and wherein the chronological identification information is generated as follows: when cyclic numbers included in the plurality of chronological identification information are compared at each priority, cyclic numbers as comparison targets at each priority become cyclic numbers in an identical stage in a cycle order or cyclic numbers one stage different in the cycle order.

6. The flash memory system according to claim 5, wherein the identification information generating means compares cyclic numbers included in the plurality of chronological identification information of physical blocks storing data in an identical scope of logical addresses to those for data stored in a physical block in which chronological identification information newly generated is to be written, in order from the highest priority to the lowest priority;

wherein the identification information generating means sequentially extracts chronological identification information including a cyclic number in a later stage in the cycle order at each priority from the plurality of chronological identification information;

wherein the identification information generating means terminates the extracting process when cyclic numbers as comparison targets in the extracting process come to be all in an identical stage;

wherein when cyclic numbers as comparison targets in the extracting process corresponding to each priority are cyclic numbers one stage different in the cycle order, a cyclic number in a later stage in the cycle order is defined as a cyclic number with the priority included in the chronological identification information newly generated; and wherein when all cyclic numbers as comparison targets are cyclic numbers in an identical stage in the cycle order, a cyclic number subsequent in the cycle order to the cyclic numbers in the identical stage is defined as a cyclic number with the priority included in the chronological identification information newly generated.

7. The flash memory system according to claim 5, wherein when an allowable number of physical blocks storing data in an identical scope of logical addresses is a positive integer n, a number of cyclic numbers included in the chronological identification information is set to (n−1).

8. The flash memory system according to claim 6, wherein when an allowable number of physical blocks storing data in an identical scope of logical addresses is a positive integer n, a number of cyclic numbers included in the chronological identification information is set to (n−1).

9. A control method of a flash memory for controlling access to the flash memory in which stored data is erased in units of physical blocks, according to information supplied from a host system, the control method comprising:

an address administering step of administering a correspondence relation between logical addresses supplied from the host system and physical addresses in the flash memory;

an identification information generating step of generating a plurality of chronological identification information which is information to discriminate a chronological relation of a plurality of physical blocks storing data in an identical scope of logical addresses and which is information including a plurality of cyclic numbers each having priority;

a writing step of writing in a physical block in which data supplied from the host system is written, the chronological identification information corresponding to the data written in the physical block; and a chronology determining step of, when there are a plurality of physical blocks storing data in an identical scope of logical addresses, determining a chronological relation of the plurality of physical blocks, based on the chronological identification information;

wherein the chronology determining step determines the chronological relation of the plurality of the physical blocks by comparing the plurality of chronological identification information corresponding to the plurality of physical blocks;

wherein in comparison of the plurality of chronological identification information, the cyclic numbers with an identical priority included in the plurality of chronological identification information are compared in order from the highest priority to the lowest priority; and wherein the chronological identification information is generated as follows: when cyclic numbers included in the plurality of chronological identification information are compared at each priority, cyclic numbers as comparison targets at each priority become cyclic numbers in an identical stage in a cycle order or cyclic numbers one stage different in the cycle order.

10. The control method of the flash memory according to claim 9, wherein the identification information generating step compares cyclic numbers included in the plurality of chronological identification information of physical blocks storing data in an identical scope of logical addresses to those for data stored in a physical block in which chronological identification information newly generated is to be written, in order from the highest priority to the lowest priority;

wherein the identification information generating step sequentially extracts the chronological identification information including a cyclic number in a later stage in the cycle order at each priority from the plurality of chronological identification information;

wherein the identification information generating step terminates the extracting process when cyclic numbers as comparison targets in the extracting process come to be all in an identical stage;

wherein when cyclic numbers as comparison targets in the extracting process corresponding to each priority are cyclic numbers one stage different in the cycle order, a cyclic number in a later stage in the cycle order is defined as a cyclic number with the priority included in the chronological identification information newly generated; and wherein when all cyclic numbers as comparison targets are cyclic numbers in an identical stage in the cycle order, a cyclic number subsequent in the cycle order to the cyclic numbers in the identical stage is defined as a cyclic number with the priority included in the chronological identification information newly generated.

* * * * *